(12) United States Patent
Maged et al.

(10) Patent No.: US 8,731,985 B1
(45) Date of Patent: May 20, 2014

(54) SYSTEM AND METHOD FOR TRANSFORMING AND MANAGING A FINANCIAL SERVICES OFFICE AND BUSINESS

(75) Inventors: Greg Maged, San Francisco, CA (US); Andrew Salesky, San Rafael, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 0 days.

(21) Appl. No.: 13/365,254

(22) Filed: Feb. 2, 2012

Related U.S. Application Data

(60) Provisional application No. 61/462,392, filed on Feb. 2, 2011.

(51) Int. Cl.
*G06Q 10/00* (2012.01)
(52) U.S. Cl.
USPC .......................................................... 705/7.11
(58) Field of Classification Search
USPC ............................................... 705/7.36, 7.11
See application file for complete search history.

(56) References Cited

U.S. PATENT DOCUMENTS

| | | | | |
|---|---|---|---|---|
| 5,680,305 | A | * | 10/1997 | Apgar, IV ..................... 705/7.28 |
| 8,370,371 | B1 | * | 2/2013 | Moncla et al. ................ 707/756 |
| 2011/0004484 | A1 | * | 1/2011 | Stewart .......................... 705/1.1 |

OTHER PUBLICATIONS

"CAPET"(calculation and payment of early termination payments, Apr. 2004, Standardisation of PFI Contracts Version 3, pp. 171-206.*

* cited by examiner

*Primary Examiner* — Romain Jeanty
(74) *Attorney, Agent, or Firm* — Innovation Partners; Charles E. Gotlieb

(57) ABSTRACT

A system and method allows an operator to operate a financial services business under license by a company, with the company or business retaining, at the end of the relationship, the confidential information of the business and some or all of the clients, and the operator agreeing not to solicit those clients or not to solicit those clients using, or otherwise use, the confidential information of the business or the company. The company transforms the office used by the business into one suitable for the business at the company's expense, and optionally using the company logo and décor to provide the appearance that the business is at least related to the company.

21 Claims, 5 Drawing Sheets

SYSTEM AND METHOD FOR TRANSFORMING AND MANAGING A FINANCIAL SERVICES OFFICE AND BUSINESS

RELATED APPLICATION

This application claims the benefit of U.S. Provisional Patent Application Ser. No. 61/462,392 entitled, "Method and Apparatus for Managing a Financial Services Office" filed by Greg Maged and Andrew Selesky on Feb. 2, 2011, having the same assignee as the present application, and is hereby incorporated by reference in its entirety.

FIELD OF THE INVENTION

The present invention is related to business operations and more specifically to financial services business operations.

BACKGROUND OF THE INVENTION

Companies may license their name, operating procedures, operational systems and marketing materials to individuals or organizations to allow those individuals or organization to operate a business under the name of the company. A franchise is one model for this approach, but a franchise isn't the only model.

In this arrangement, the operator may make an initial investment, which can be fairly substantial, and the company may also make an investment, and then the operator then runs the business under the company's name with guidance and assistance from the company.

If the operator does not maintain certain standards, or simply wishes to stop running the business, the company may have the right to take over the business or transfer it to another operator. Because the operator does not have rights in the name, but was only licensed to use the name, when the company takes over operation of the business from the operator, the customer goodwill, which may be centered largely in the name of the company, usually follows the business. If the operator that was formerly operating it starts a similar business, the customers of the old business will not typically follow the operator to that new business because of the fact that the goodwill built up over the time the business was operated remains in the business name. Because the goodwill is at least in part a result of the name, marketing materials and operational systems, all or most of which are developed and maintained by the company, the fact that the goodwill reverts to the company protects their investment in the name, marketing and operational systems they provide.

Without being able to protect their investment in their name, marketing, and operational systems, most companies could not license them profitably. This is because their value to the operator that licenses them from the company is highest when used to acquire customers and learn how to run the business. Once that has been done, their value is reduced. If a company licensed these things to an organization or individual and was not able to retain the goodwill, the operator would license them only for a brief period of time, then set up a different company and take the customers of the old company with them. Additionally, setting up an office can represent a substantial investment as a bare office is transformed into one that looks like a business, with furniture, décor, and the like, and much of that investment would not be worthwhile to recover if it were used for only a short time. Although a company in this situation could charge higher up front fees to compensate operators for the brief period of time they were allowed to benefit from their name, marketing and operational systems, the fees would have to be so high as to discourage most individuals or organizations from entering into these types of arrangements.

However, there are some business that don't fit into this arrangement. For example, those businesses in which repeated, personal contact is employed by a single individual don't work well using the arrangement described above. One reason such arrangements don't work well is that more of the goodwill is personal, which means that the company has no way of protecting its investment in its name, marketing and operational systems, because some or all of the goodwill can move with the operator if the relationship with the company is terminated. As a result, a party licensing its name, marketing and operational systems to an operator in this arrangement may require much more of the costs, including the cost of transforming an office into a professional space to be borne by the operator to whom such things are licensed. Because that individual usually doesn't have sufficient capital to pay very much when starting out, instead of charging more, the amount of money the company may invest in office transformation, marketing and operational systems that can benefit them can be minimal. As a result, the items licensed may not be very valuable, and so the business may suffer as a result.

What is needed is a system and method that can allow a company to license its name, marketing and operational systems while protecting its investment in such items.

SUMMARY OF INVENTION

A system and method allows an operator to license the name, marketing and operational systems of a company with little to no up front investment by the operator. A partnership or other business arrangement may be entered into for operation of the business. The company may pay the costs of transforming an office into a space that looks like a professional business, including marketing displays, furnishings, and décor. Clients of the business and their information are considered confidential property of the partnership or property of the company and the operator promises to keep such information confidential and not to use information for purposes outside the business.

If the relationship is terminated between the company and the operator, clients will remain with the business (to be run by the company or a different operator under the same or similar arrangement with the company as the prior operator) or revert to the company and the operator agrees not to solicit the clients of the business and the company agrees to pay the operator. Such payment may be a function of any or all of the length of time the business was operated, the number of clients the operator brought to the business, the experience the operator had when they entered into the relationship, the size of each client account, the size of the total account base the operator brought to the business, the revenue generated to the business by the operator each client the operator brought to the business, e.g. for the company or business in a period of time, the total revenue the business received (or received for a period of time) by clients the operator brought to the business, the length of the relationship with the business of each of the clients the operator brought to the business, the number of clients brought to the business by the operator who participated in specially designated programs of the company, or other factors.

DETAILED DESCRIPTION OF A PREFERRED EMBODIMENT

Figure 1:
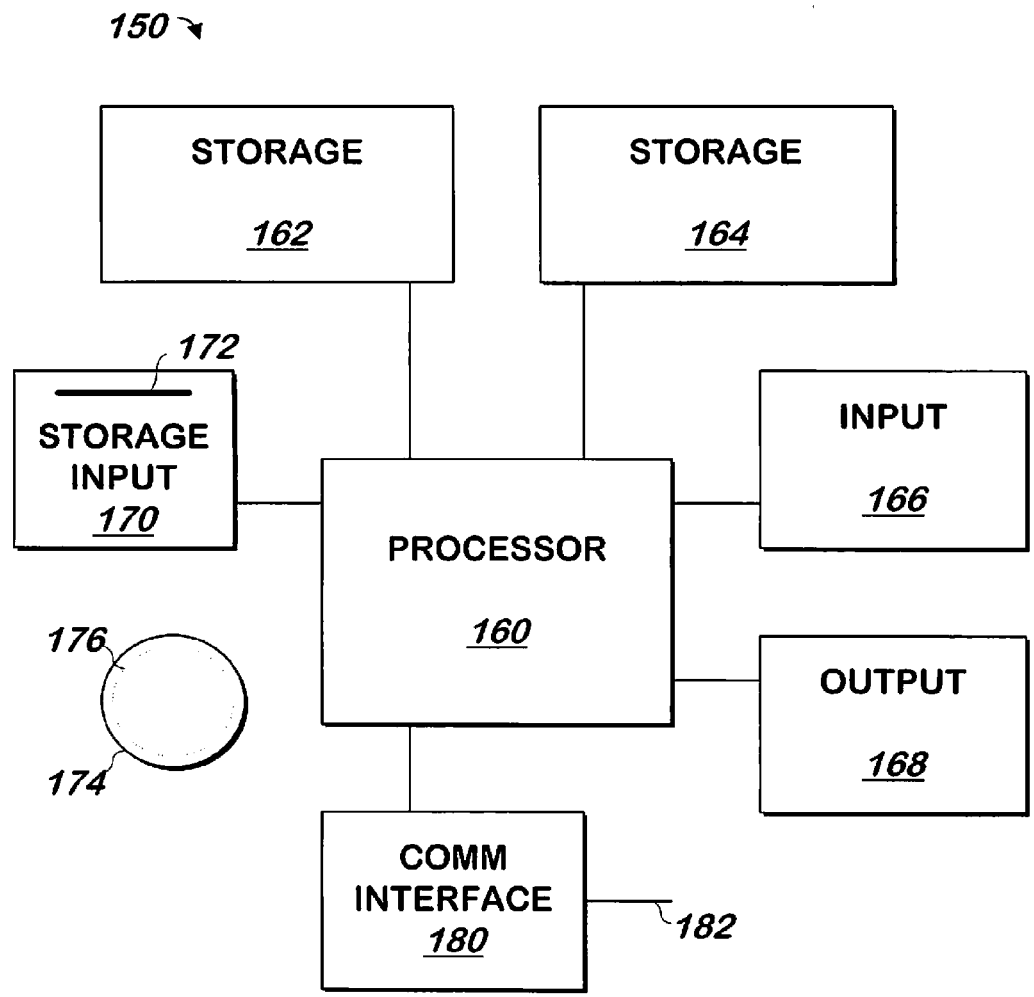
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T-SERIES SERVER running the SOLARIS operating system commercially available from ORACLE CORPORATION of Redwood Shores, Calif., a CORE I7-compatible personal computer system such as are available from DELL COMPUTER CORPORATION of Round Rock, Tex. running a version of the WINDOWS operating system (such as XP, NT, VISTA or 7) commercially available from MICROSOFT Corporation of Redmond Wash. or a Macintosh computer system running the OSX operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a DROID 2 mobile telephone commercially available from MOTOROLA CORPORATION of Schaumberg, Ill. running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2:
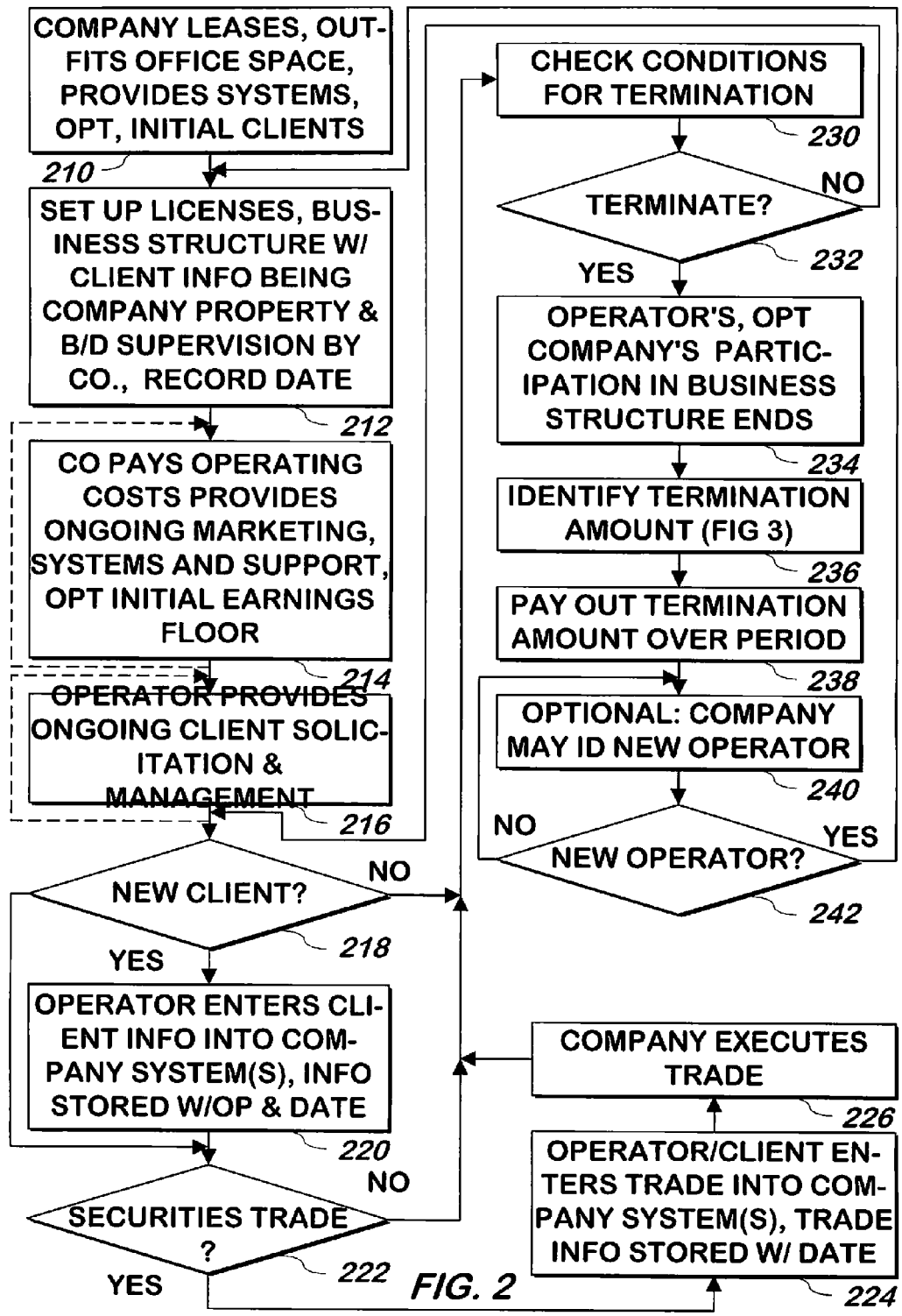
FIG. 2 is a flowchart illustrating a method of transforming and operating a financial services office according to one embodiment of the present invention.

Referring now to FIG. 2, a method of operating a financial services office is shown according to one embodiment of the present invention. A company leases office space and outfits an office with furniture and systems 210. In one embodiment, all or nearly all of the costs of step 210 are borne by the company, with the operator of the office providing little to no investment in such office and providing little to no fee to the company for setting up the office. The systems may include both operating procedures and computer systems, both front end computers and back end systems, which may be provided as a service to the business. Outfitting the office may include transforming the space into one differently decorated, such as using a general theme or designs consistent with other offices transformed by the company, and may include logos and other marketing materials of the company, as well as furnishings and the like. In one embodiment, the transformation of the office is performed by adding furnishings and other décor. The office will be used by the operator to solicit and service clients of the business.

In one embodiment, some clients of the company may optionally be provided to the business by the company. Such clients may be those within a geographic distance of the office that may meet optional other criteria such as a maximum or minimum size of the client, as measured by the amount of assets held for the client, trading revenue, number of trades or other criteria.

Licenses and/or other agreements may be arranged 212 from the company to the business and vice versa. The licenses may include licenses of the company's name or trademarks, licenses of the use of the company's marketing materials, and licensing of the use of the company systems, both computer systems and processes. In one embodiment, licenses include restrictions on using the name, marketing materials, processes or computers for non-business related purposes.

As part of step 212, a business structure may be arranged and agreed to, such as an LLP, LLC, partnership or other arrangement. In one embodiment, the business structure will include an agreement that some or all of the client information (name, address, account size, holdings, preferences, etc.) are considered the confidential property of the company, and the agreement will spell out procedures for maintaining confidentiality of such information (e.g. operator is not allowed to maintain printed copies of the confidential information even for the business, operator cannot download confidential information, etc.). In one embodiment, the business structure will include an agreement not to solicit clients of the company for a period of time after the operator stops operating the business, an agreement not to solicit for a period of time after the operator stops operating the business clients that were serviced by the business while the operator was operating it, or an agreement not to compete with the company within a geographic distance of the office for a period of time after the operator stops operating the business. In one embodiment, the business structure will include the performance by the company of broker-dealer supervisory functions towards the operator if the operator of the company is an individual, or the operator's employees if the operator of the company is an organization. The date of the formation of the company structure may be recorded as part of step 212.

As part of an ongoing process shown in step 214, during the operation of the business, the company will provide ongoing marketing materials and operations and support at the company's expense, or mostly the company's expense. If the operator is charged fees by the company, the fees will be below the earnings of the business for at least a minimum period of time. In one embodiment, the company will provide a fee to the business if earnings fall below a specified minimum during an initial period after the operator starts operating the business. The minimum may be a monthly minimum with the fee paid only in the event that cumulative earnings have not reached an amount computed by a formula, both agreed to in step 212. The dashed line in the Figure returning to itself indicates that step 214 is part of an ongoing, independently operating, process.

As part of an ongoing process shown in step 216, the operator provides ongoing solicitation of clients, and management of the office and clients using the systems of the company licensed to the business. Step 216 may be performed using some or all of the same or similar actions one would use if the operator were operating a branch office of the company.

If the business gets a new client 218, the operator will enter conventional client information (name, address, social security or other tax identifier, etc.) into the company systems licensed to the business, and such information is stored in such company computer systems in a conventional manner so that a client account may be set up, such account is also associated in such company computer systems with the name of the operator and the date 220 and the method continues at step 222. Otherwise 218, the method continues at step 222.

If the client wishes to perform a trade of a security (e.g. buying or selling the security using a conventional exchange or other similar entity or arrangement) 222, information about the trade is received into the company computer systems licensed to the business, from the client or operator, and such information is stored in such computer systems associated with an identifier of the operator and the date 224. The company executes 226 the trade in a conventional manner via a conventional trading computer system coupled to the company computer system via a network, receives a fee from the client for such a trade (or receives a fee from the client that may allow the client to trade for no additional fees) and performs conventional bookkeeping and settlement activities related to the trade using company computer systems including the client account in the company systems.

In one embodiment, there may be many operators at different locations across the country, with each operator bringing in different clients, and the company may bring in its own clients. In one embodiment, any operator may initiate a trade for any client having an account in the company computer systems.

Conditions for termination of the operator's relationship with the business may be checked 230. Such conditions may include fraud, mismanagement, new client targets, not meeting revenue targets, the operator's retirement or stopping its relationship with the business and the like. If the conditions for such termination are not met 232, the method continues at step 218, for example, using the same operator.

If the conditions for termination are met 232, a termination amount is identified 234 as described in more detail below with respect to FIG. 3, and the termination amount is paid out using one or more payments over a payout period. In one embodiment, the payout period coincides with the expiration of any of the agreements described above, such as the confidentiality agreement or agreement not to solicit clients or agreement not to use confidential company information.

At any time after such termination, the company may optionally identify 240 a new operator for the business, and if a new operator is identified 242, the method continues at step 212 using that new operator. Otherwise 242, the method may continue at step 242 until such time as a new operator is identified. At any time after such termination, the company may terminate operations of that office, or assign some or all of the clients of the business to the company, and/or one or more other operators.

In one embodiment, clients brought to the company or partnership within a threshold period of time after the company is started may be available for the operator to solicit and their confidential information would be allowed to be used, even if the relationship between the company and the operator is terminated. Thus, the "book of business" the operator initially brings to the company would not be part of the clients not solicited by the operator. In the event that the operator nevertheless agrees not to solicit such clients, the payment for such accounts may be greater than it would if the operator does not agree not to solicit such clients.

Figure 3:
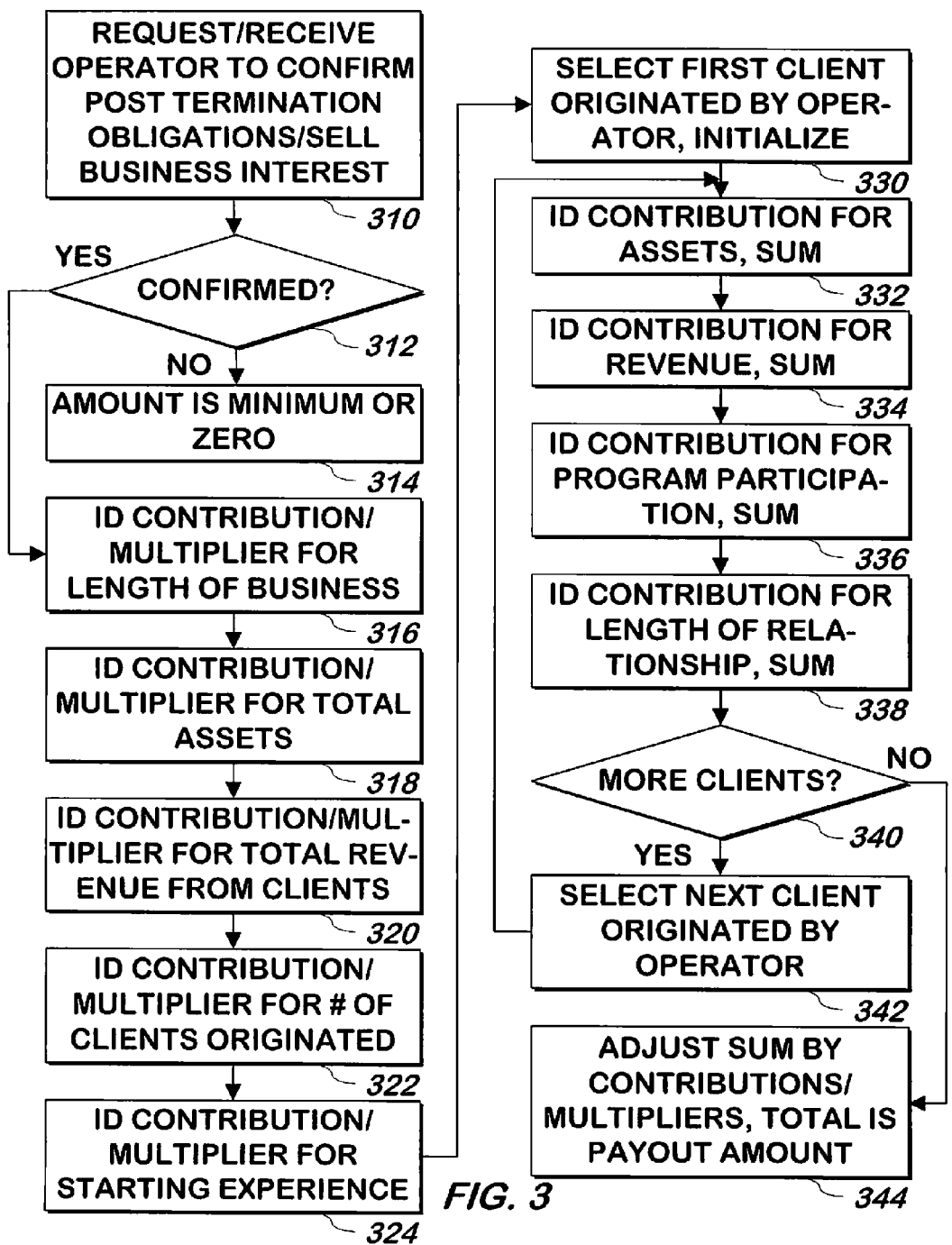
FIG. 3 is a flowchart illustrating a method of identifying an amount to pay an operator of a financial services office upon termination of a business relationship according to one embodiment of the present invention.

Referring now to FIG. 3, a method of identifying an amount to pay an operator of a financial services business is shown according to one embodiment of the present invention. The operator may be requested to confirm 310 his or her obligations after the termination of the business relationship is complete and such confirmation may be received. The operator may additionally execute a sales agreement selling his interest in the business structure to the company as part of the agreement made when the operator entered the business and in conjunction with an agreement not to solicit and such executed agreement is received as part of step 310.

If one or both of the items described in step 310 are not received by the company 312, the amount the operator is paid is zero or a minimum amount, far less than would otherwise be paid. If one or both are received by the company 312, the method continues at step 314 or a later step. Not all of the steps 314-318 need to be performed, though in one embodiment, at least some of them are.

At step 314, a contribution or multiplier based on the length of the business relationship with the operator is identified. The contribution or multiplier is larger for longer business relationships than it is for shorter business relationships.

A contribution or multiplier based on the total assets including securities and cash or cash-like securities such as money market funds, at the time of termination of all of the clients the operator brought to the business (excluding those provided by other sources such as the company or other operators, even if the operator serviced them) may be identified 318. The contribution or multiplier is larger if the total assets are larger than it is if total assets are smaller. Total assets may be identified at the time of termination or a different time, or an average over time, such as the last year before the termination, may be used.

A contribution or multiplier based on the revenue from securities trading of the clients the operator brought to the business (excluding those provided by the company or other operators, even if trades were initiated from other clients by the operator during the operation of the business) during a period of time, such as the most recent year or for the entire business relationship between the operator and the company, is identified 320. The contribution or multiplier is larger for higher revenue than it is for lower revenue.

A contribution or multiplier based on the number of the clients the operator brought to the business (excluding those provided by other sources such as the company or other operators, even if the operator serviced them) may be identified 322. The contribution or multiplier is larger if the number of such clients is larger than it is if the number of such clients is smaller.

A contribution or multiplier based on the experience level of the operator when the operator began the relationship with the business may be identified 324. The contribution or multiplier is larger if the number of years of experience in the industry (or at the same type of position) of the operator when the operator began the relationship with the business is higher than it is if the number of years of experience of the operator is lower. The number of employees in operator's chain of command at a prior position may also be a factor in this contribution or multiplier, with a higher number of employees causing a higher contribution or multiplier than one with fewer direct reports.

A first of such clients (originated to the business by the operator) is selected 330 and a balance is initialized, for example, to zero. A contribution for the amount of assets including securities and cash in the securities account of the selected client is identified and the contribution is added to the balance 332. The contribution is larger if the amount of assets is larger than it is if the amount of assets is smaller.

A contribution for the amount of revenue received from the selected client's activities with respect to the securities account of the selected client is identified and the contribution is added to the balance 334. The contribution is larger if the revenue is larger than it is if the revenue is smaller. Activities may be considered if performed in the last year or other period or the activities may be considered since the day the operator brought in the client.

A contribution for the selected client having participated in certain securities-related or non securities-related programs of the business or company is identified and the contribution is added to the balance 336. The contribution is larger if the selected client participated in more selected programs than it is if the selected client participated in fewer selected programs. Participation may be measured by the then-current participation at the time of the termination or at any time. The contribution of the selected client may be based on the length of time of such participation or any participation may be considered equally regardless of the amount of time the selected client participated.

A contribution for the length of the relationship of the selected client with the business is identified and the contribution is added to the balance 338. The contribution is larger if the length of the relationship is longer than it is if the length of the relationship is shorter.

In one embodiment, the contribution identified in step 338 is larger for clients the operator agrees not to solicit, if the relationship between the business and the client is nearly as long as the relationship of the operator with the business.

If there are more clients originated by the operator 340, the next such client is selected 342 and the method continues at step 332 using the newly selected client.

If there are no more clients originated by the operator 340, the balance is adjusted by the contributions or multipliers identified in steps 316 through 322 either by adding the contribution to the balance or multiplying the balance by the various multipliers. Such contributions may be greater than or less than zero and the multipliers may be greater than or less than 1 in one embodiment. The balance, so adjusted, is used as the basis for payment to the terminated operator, such as by dividing the adjusted balance by 24 and paying that amount each month for 24 months. As noted, the term of the payments may match a period of confidentiality or non-competition or the like.

Figure 4:
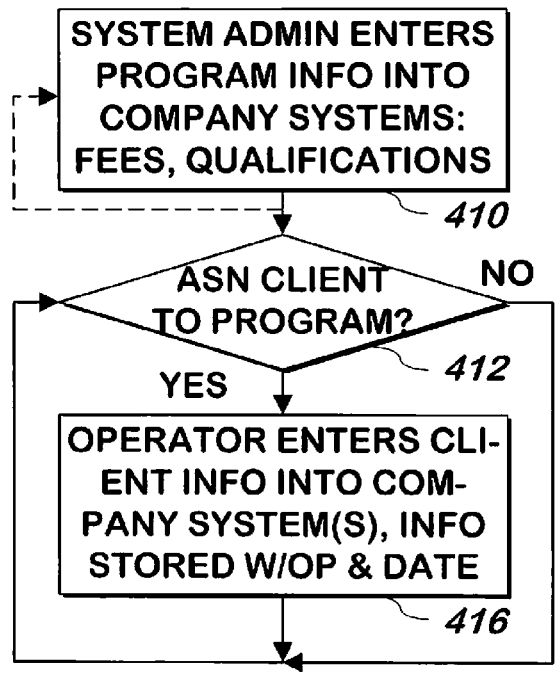
FIG. 4 is a flowchart illustrating a method of setting up and assigning clients to programs according to one embodiment of the present invention.

FIG. 4 is a flowchart illustrating a method of assigning clients of a financial services office to programs offered at the office according to one embodiment of the present invention. Referring now to FIG. 4, program information defining one or more programs, including any fees and qualifications applicable to the program, may be entered into the company systems, such as by a system administrator, and such information may be stored associated with a program identifier 410. Such program information may be received or updated at any time as indicated by the dashed line in the Figure.

At any time, after such a program has been defined, the operator may assign any client to the program, and if the operator assigns a client to the program 412, then the operator enters client information corresponding to the assigned client into the company systems, and the client information is stored associated with the program identifier, along with the date and time when the client was assigned to the program and the operator who assigned him 416. Any client may be assigned to any number of programs at any time. A system administrator may also make such assignments in one embodiment.

Figure 5B:
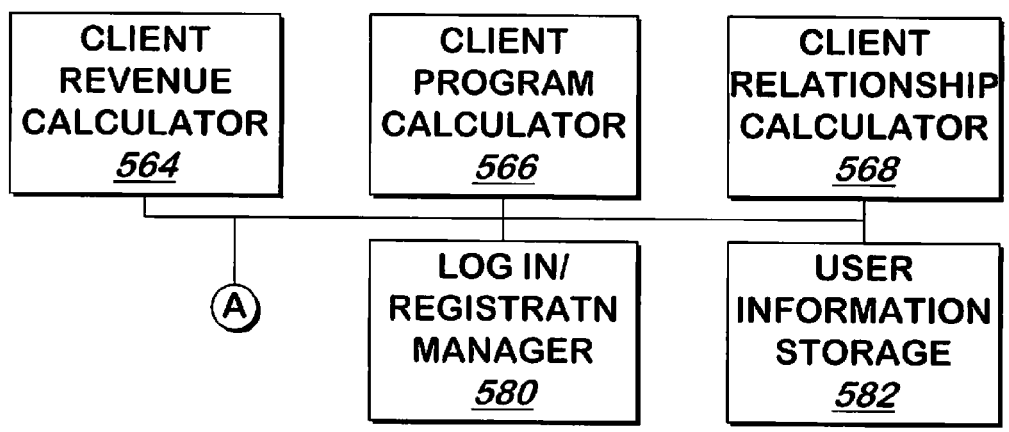
FIG. 5, consisting of FIGS. 5A and 5B, is a block schematic diagram of a system for paying an operator of a financial services office upon termination of a business relationship to enable transforming and operating a financial services office according to one embodiment of the present invention.
Figure 5A:
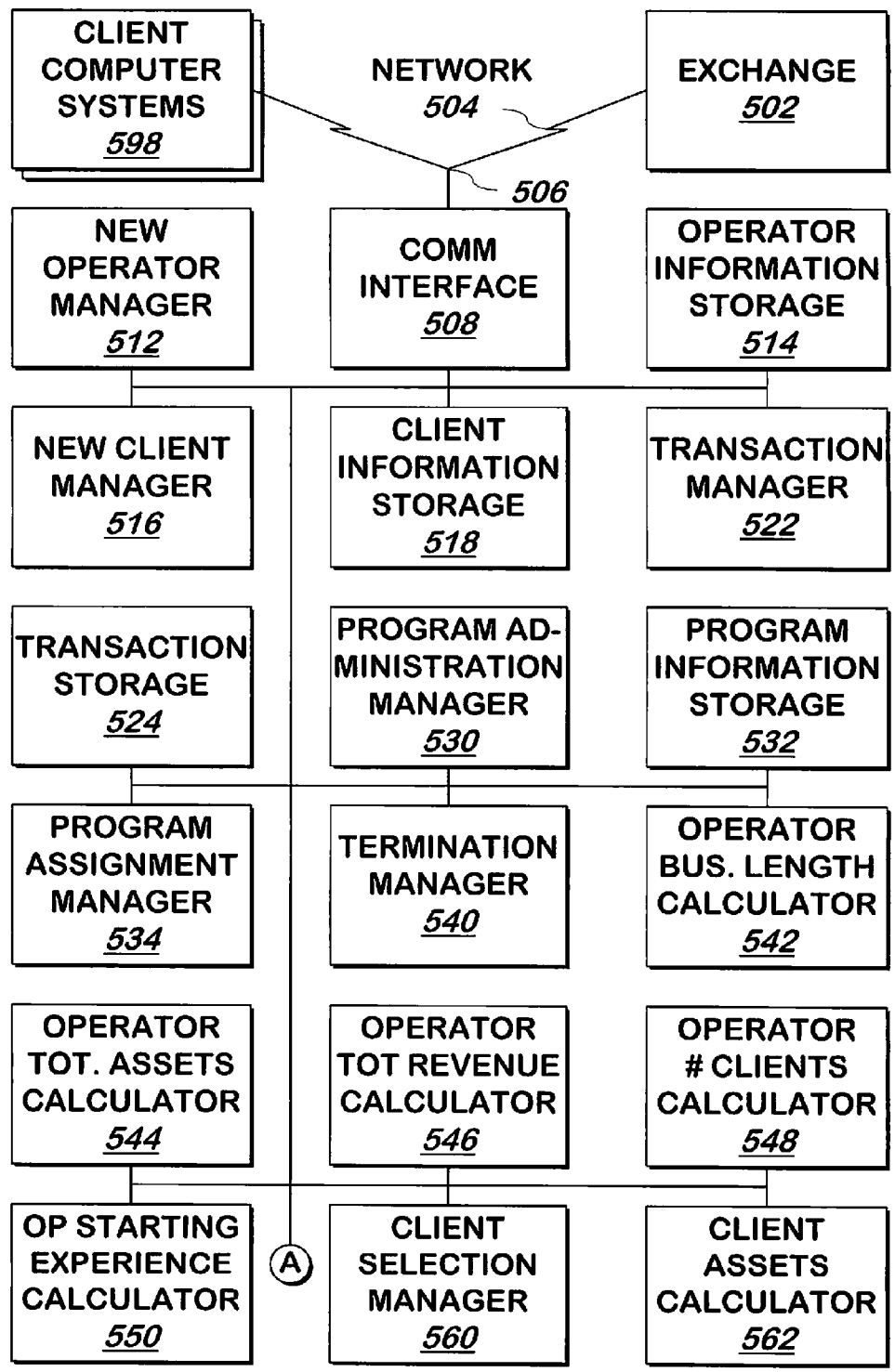

FIG. 5, consisting of FIGS. 5A and 5B, is a block schematic diagram of a system for paying an operator of a financial services office upon termination of a business relationship to enable transforming and operating a financial services office according to one embodiment of the present invention. Referring now to FIG. 5, the system includes a communication interface 508 which may include a conventional communication interface running suitable communication protocols, such as Ethernet, TCP/IP or both. In one embodiment, unless otherwise noted herein, all communications are made via its respective input/output 506 of its communication interface 508 via network 504, which may include a conventional Ethernet network, the Internet or both.

A company, such as a financial services company, may lease and outfit an office space as described above, including providing any office systems and optionally any initial clients, as described above. The company may provide the outfitted office space to a business operator from which to operate the business and acquire clients as described above, and the company may set up licenses and/or other agreements, including licenses of the company's name or trademarks, licenses of the user of the company's marketing materials, and licensing of the use of the company systems, both computer systems and processes, and a business structure, such as an LLP, LLC, partnership or other agreement, with the operator as described above. In one embodiment, a system administrator for the company may provide the licensing, agreement, and/or business structure information to new operator manager 512 via a suitable user interface provided by new operator manager 512. New operator manager 512 receives any such licenses, agreements, and/or business structure information and stores it in operator information storage 514 along with a unique operator identifier, such as the user identifier of the operator, and the date and time of establishment of the relationship between the company and new operator as described above. The system administrator may also provide, and new operator manager 512 may also receive and store into operator information storage 514, the operator's level of starting experience, or experience level of the operator when the operator and company enter into the described business relationship. All storage elements described herein, such as operator information storage 514 may include conventional memory and/or disk storage and may include a conventional database.

At any time, a user (such as a client or an operator or a system administrator) of the system of FIG. 5 registers with the system using log in/registration manager 580, for example, by selecting a username and password, which log in/registration manager 580 stores into user information storage 582. Users interact with the system using the user's respective client computer system, which may include a conventional personal computer or smart phone coupled to the Internet using conventional techniques. When the user registers, the user may have default privileges to act as a client, and a system administrator may assign additional privileges to allow the user to perform the functions described herein as a system administrator, or an operator. Log in/registration manager 580 may assign a numeric user identifier to that user in addition to the username.

At any time, the user may log in to log in/registration manager 580 by entering their username and password into a user interface log in/registration manager 580 provides in response to a request received via a conventional browser, and log in/registration manager 580 validates the user using the information stored in user information storage 582 using conventional techniques. If the user is validated, log in/registration manager 580 places an encrypted cookie onto the user computer system that identifies the user to the other elements described herein using conventional techniques, and log in/registration manager 580 provides a web page with links or buttons to allow the user to perform the functions described herein based on that user's privileges. When the user presses the button or link corresponding to a function, the user's client computer system 598 will request a web page from the element described herein and the element will read the cookie to identify the user.

Although web pages are described herein, a conventional application may be used instead of or in addition to the web pages to interact with the system described herein.

As described above, the company may pay the operating costs to run the business, provide ongoing marketing, systems and support, and optionally provide initial earnings floor information on behalf of the operator as described above. The operator may provide ongoing client solicitation and management on behalf of the company.

At any time while the operator is employed in the business relationship, if the operator originates or brings in any new clients to the business, then the operator may enter client information corresponding to the new client into the company system(s), including any client registration information, via a suitable user interface provided by new client manager 516. In one embodiment, the operator may input such information using a separate client computer system 598 coupled to the network. New client manager 516 receives any new client information provided by the operator and stores it in client information storage 518 associated with one or more unique client identifiers, the operator identifier of the operator from which the new client information is received, and the date and time of client origination or when the new client information is received. If the client registers to log in/registration manager 580, the client may supply one such unique identifier that new client manager 516 provides to the operator, and log in/registration manager 580 associates the unique identifier with the username in user information storage 582.

Once a client is added to the company system(s), the client may provide assets including cash and securities to the company and business, and the operator of the business receiving the assets may enter asset information, including the type and amount of assets provided, along with the client identifier of the client providing assets to new client manager 516 via a suitable user interface that new client manager 516 provides. New client manager 516 receives the asset information and stores the asset information in client information storage 518 associated with the client identifier of the client from which assets are received, the operator identifier of the operator entering the asset information, and the date and time of when the assets are received.

At any time, a user such as a system administrator may set up one or more programs, such as securities-related or non-securities-related programs, as described above. If the user provides an indication to set up a program, program administration manager 530 provides a suitable user interface to allow the user to provide program information, including any fees associated with the program and any rules or qualifications associated with the program, as described above. The user provides the program information, program administration manager 530 receives it, and program administration manager 530 stores the program information in program information storage 532 associated with a program identifier.

Once a program has been set up as described above, the operator may request to assign a client to the program. If the operator makes such a request to assign the client to the program, such as by clicking an add to program link provided by program administration manager 530, program assignment manager 534 may provide a suitable user interface to allow the operator to enter client information corresponding to the client that the operator is assigning to the program. The operator provides the client information, program assignment manager 534 receives it, and program assignment manager 534 stores the program identifier corresponding to the program to which the client is assigned in client information storage 518 associated with the client identifier and the date and time of program assignment.

At any time, any client, or an operator, on behalf of any client, may perform a securities trade or transaction using the client's securities account, as described above, and a user, such as the client initiating the trade or a business operator representing the client, may enter securities transaction information into the company system(s). In one embodiment, when prompted by the client or operator initiating the securities transaction, transaction manager 522 provides a suitable user interface to allow the operator or client to provide securities transaction information. The operator or client may provide the securities transaction information using a separate client computer system 598 coupled to network 504, and transaction manager 522 receives the transaction information and stores it in transaction storage 524 associated with the client identifier corresponding to the owner of the securities account initiating the transaction or on whose behalf the operator performed the transaction, the operator identifier of the operator entering the transaction information (if the transaction is entered by an operator and not the client), and the date and time when the securities transaction is initiated as described above.

When transaction manager 522 receives such transaction information, it executes the transaction in any conventional manner via any conventional exchange 502 coupled to the company computer systems via network 504, and calculates, receives or retains any fees from the client for such transaction as described above. In one embodiment, to determine the fees due for a securities transaction, transaction manager 522 may determine if the client is a participant in any company fee program or programs, such as a program that allows the client to initiate qualifying securities transaction for a flat fee, and if so, whether the transaction initiated by the client is a qualifying transaction under the conditions of any such program of which the client is a participant. Transaction manager 522 may identify which program(s), if any, that the client is a participant of from client information storage 518, and retrieve fees information and rules or qualifications information for any programs in program information storage 532 as described in more detail below. Such fees and qualifications corresponding to any programs may be stored in program information storage 532 at any time, such as by a system administrator, and operators may assign clients to programs as described above.

If the client is a participant in a company fee program, and the transaction initiated by the client (or on behalf of the client by the operator) is a qualifying transaction for such a program of which the client is a participant, then transaction manager 522 calculates fees for the securities transaction based on the fees and qualifications of such program and any previous securities transactions associated with the client in transaction information storage 524. For example, if the client is a participant of a program that allows the client to make up to 30 securities trades per year for a flat fee of $100, and the client has not already made more than 29 securities trades in the same year, then transaction manager 522 may calculate that no additional fees are due from the client at the time of the transaction. In one embodiment, transaction manager 522 may store any fees received for securities transactions in transaction storage 524 associated with the client identifier of the client initiating the transaction and the date and time of when the fees are received from the client. If no new fees are due from a securities transaction, then no new fees or revenue information may be recorded at the time of the transaction.

In one embodiment, if the client is not a participant of any program for which the securities transaction is a qualifying transaction, then a default program may be identified in program information storage 532, and the default program may be used to calculate the fees associated with the securities transaction as described above.

At any time during the course of normal business, the company or a representative of the company such as a system administrator or other employee of the company may check conditions for termination of the operator's relationship with the business, as described above. In one embodiment, conditions for termination may be conditions previously set up via new operator manager 512 when the operator was hired or at any time during the operator's business relationship with the company, and any information from any storage elements 514, 518, 524, 532 or any other storage may be retrieved and used in checking the conditions for termination.

If the company determines that conditions for termination, described above, have been met, or if the operator retires or otherwise stops the relationship with the business, then the operator, and optionally the company, may end their participation in the business relationship, and a termination amount is identified for the operator, as described in more detail above and below.

The company may pay out the identified termination amount to the terminated operator immediately or over a period of time, such as over a period of one year or two years. Optionally, at any time after the business relationship has been terminated between the company and the operator, the company may also identify a new operator, provide the office space outfitted as described above to the new operator, and set up licenses and the business structure via new operator manager 512 with the new operator as described above.

If the operator or the company terminates the business relationship between the operator and the company, as described above, termination manager 540 determines the termination amount for a terminated operator. In one embodiment, termination manager 540 requests confirmation from the operator that the operator will comply with the post-termination obligations of the operator, such as any covenant to not compete with the company for clients or solicit clients, as well as of any sales agreement previously agreed upon when the operator entered the business relationship whereby the operator sells his/her interest in the business structure to the company, as described above, or requests from a system administrator that such confirmation has been received. In one embodiment, termination manager 540 builds an termination object including the operator identifier corresponding to the terminated operator and date and time of termination, and termination manager 540 requests confirmation from the operator, such as by requesting a confirmation signature on a post-termination contract or other document, or in any other manner.

If termination manager 540 does not receive confirmation from the operator of post-termination obligations, termination manager 540 may determine the operator's termination amount to be zero or to be a minimum amount much less than would be determined if confirmation had been received, as described above. In one embodiment, termination manager 540 adds the termination amount to the termination object, stores the termination amount in operator information storage 514 associated with the terminated operator identifier and the date and time of termination.

If the terminated operator confirms his/her post-termination obligations and business interest sales agreement as described above, such as by providing a confirmation signature, then termination manager 540 receives the confirmation(s), adds the confirmation to the termination object, and passes the termination object to operator business length calculator 542. In one embodiment, termination manager 540 also stores the received confirmation, along with the date and time that such confirmation is received and the effective date of the termination that termination manager 542 requests and receives, in operator information storage 514 associated with the operator identifier corresponding to the terminated operator. Termination manager 540 also stores the effective date of the termination in the termination object before passing it as described above.

Operator business length calculator 542 receives the termination object from termination manager 540 and identifies a business length contribution or multiplier based on the length of time of the business relationship between the operator and the company as described above with respect to step 316. To calculate the length of the business relationship between the company and the operator, operator business length calculator 542 retrieves from operator information storage 514 the date and time of hire associated with the operator identifier in the received termination object which indicates the date and time that the operator entered into the business relationship. In one embodiment, operator business length calculator 542 compares the effective date and time of termination in the received termination object to the retrieved date and time of hire to calculate the length of the business relationship between the terminated operator and the company, and operator business length calculator 542 may identify the corresponding business length contribution amount or multiplier using a business length table or function that determines the business length contribution or multiplier as a function of the calculated length of the business relationship. For example, a business length table or function may indicate that a business relationship of 0-2 years translates to a $25,000 contribution, 3-4 years equals a $50,000 contribution, 5-6 years equals a $75,000 contribution, etc. As described herein, any elements identifying any contribution amounts or multipliers may do so using similar tables and/or functions.

Operator business length calculator 542 adds the identified business length contribution or multiplier to the termination object and passes the object to operator total assets calculator 544.

Operator total assets calculator 544 receives the termination object and identifies the total assets contribution or multiplier for the terminated operator. The total assets contribution or multiplier may be based on the total assets of all the clients the operator brought to the business, assets including securities and cash or cash-like securities such as money market funds, or any other assets, as described above with respect to step 318 of FIG. 3. In one embodiment, operator total assets calculator 544 retrieves from client information storage 518 any assets information corresponding to the clients associated with the operator identifier included in the termination object. Operator total assets calculator 544 may retrieve client asset information corresponding to the current time, the date and time of termination, or from another time, or from various other times, and operator total assets calculator 544 calculates the total assets associated with such terminated operator's clients as described above and identifies the total assets contribution amount or multiplier corresponding to the calculated total assets of terminated operator's clients. Operator total assets calculator 544 adds the total assets contribution amount or multiplier to the termination object and sends the termination object to operator total revenue calculator 546.

Operator total revenue calculator 546 receives the termination object and calculates the total revenue generated by the operator as described above with respect to step 320 of FIG. 3. In one embodiment, operator total revenue calculator 546 retrieves revenue information in transaction information storage 524 associated with the operator identifier included in the termination object, such as any fees received from the operator's clients for securities trades or other transactions. In one embodiment, if the operator has also processed transactions for others' clients, operator total revenue calculator 546 may also retrieve such information, marked in transaction storage 524 with the operator identifier included in the termination object, to calculate the operator's total revenue as described above. In one embodiment, if one operator processes transactions for another operator's client not originated by the operator, the revenue credited to each operator or to the operator processing the transactions is 50% of the actual revenue. Operator total revenue calculator 546 identifies a total revenue contribution amount or multiplier for the operator using the total revenue calculated for the operator, adds the total revenue contribution amount or multiplier to the termination object, and sends the termination object to operator number clients calculator 548.

Operator number clients calculator 548 receives the termination object and identifies the number of clients that the operator originated or brought to the business, and identifies an originated clients contribution amount or multiplier as described above with respect to step 322 of FIG. 3. In one embodiment, operator number clients calculator 548 identifies the number of clients originated by the operator by summing the number of clients marked in client information storage 518 as originated by the operator identifier included in the received termination object. Operator number clients calculator 548 adds the originated clients contribution amount or multiplier to the termination object and sends the termination object to operator starting experience calculator 550.

Operator starting experience calculator 550 identifies the operator's level of starting experience, or experience level of the operator when the operator entered the business relationship with the company, and identifies a starting experience contribution amount or multiplier for the operator as described above with respect to step 324. In one embodiment, operator starting experience calculator 550 identifies in operator information storage 514 the level of starting experience associated with the operator identifier included in the termination object, calculates the starting experience contribution amount or multiplier, such as by using a table or function as described above, adds the starting experience contribution amount or multiplier to the termination object, and sends the termination object to client selection manager 560.

Client selection manager 560 receives the termination object, selects the first client originated by the operator, and adds a contribution bucket or balance to the termination object, initializing the contribution bucket to zero (or any other amount) as described above. To select the first client originated by the operator, in one embodiment, client selection manager 560 identifies the first client in client information storage 518 marked as originated with the operator identifier included in the termination object and adds the client identifier corresponding to such originated client to the termination object. Client selection manager 560 sends the termination object to client assets calculator 562.

Client assets calculator 562 receives the termination object, determines the amount of assets, including securities and cash, in the securities account of the selected client, and identifies a corresponding contribution for assets amount as described above with respect to step 332. In one embodiment, client assets calculator 562 may retrieve the total assets associated with the selected client in client information storage 518 at the current date and time or the effective date and time of termination included in the termination object, or client assets calculator 562 may calculate the average assets associated with the selected client over a time period, such as one year prior to the date and time of termination, or client assets calculator 562 may determine the amount of assets associated with the selected client in any other manner. Client assets calculator 562 may identify the contribution for assets amount for the selected client using the determined amount of assets and a contribution for assets table and/or function as described above. Client assets calculator 562 adds the contribution for assets amount to the contribution bucket included in the received termination object and sends the termination object to client revenue calculator 564.

Client revenue calculator 564 receives the termination object and identifies a contribution for revenue amount for the selected client as described above with respect to step 334. In one embodiment, client revenue calculator 564 retrieves and/or calculates the amount of revenue received from activities with respect to the securities account of the selected client, such as any transaction fees collected for securities transactions, from transaction storage 524. Client revenue calculator 564 may retrieve (and/or sum) revenue information corresponding to the selected client from a specified period of time, such as the last year prior to the termination, or all revenue information corresponding to the selected client since the day the operator brought in the client, or any other revenue information corresponding to the selected client in transaction storage 524, optionally split as described above. In one embodiment, client revenue calculator 564 identifies the contribution for revenue amount for the selected client using the revenue information determined for the selected client, such as by using a table correlating amounts of revenue generated through a client with contribution for revenue amounts. Client revenue calculator 564 adds the contribution for revenue amount determined for the selected client to the contribution bucket included in the termination object and sends the termination object to client program calculator 566.

Client program calculator 566 receives the termination object, determines a contribution for program participation amount for the selected client as described above with respect to step 336, adds the contribution for program participation amount to the contribution bucket included in the termination object, and sends the termination object to client relationship calculator 568. In one embodiment, to determine the contribution for program participation amount corresponding to the selected client, client program calculator 566 identifies any program identifiers associated with the selected client's client identifier in client information storage 518, optionally along with the corresponding date and time of program assignment stored with each program identifier. Client program calculator 566 may identify only programs which the selected client is a participant of at the current date and time, or at the effective date and time of the operator's termination, or it may identify all programs of which the selected client has ever participated, as described above. In one embodiment, client program calculator 566 sends the termination object, with the contribution for program participation amount added to the contribution bucket, to client relationship calculator 568.

Client relationship calculator 568 receives the termination object, identifies a contribution for length of relationship for the selected client, adds the contribution for length of relationship amount to the contribution bucket included in the termination object, and sends the termination object to client selection manager 560. In one embodiment, client relationship calculator 568 identifies the contribution for length of relationship, as described above with respect to step 338, based on the length of the relationship between the selected client and the business, and client relationship calculator 568 determines the length of such relationship using the date and time of client origination stored for the selected client in client information storage 518 and the current date and time or effective date and time of the termination included in the termination object.

When client selection manager 560 receives the termination object, client selection manager 560 determines whether contribution amounts have yet to be determined for any more clients marked as originated by the terminated operator in client information storage 518. If any such additional clients exist, client selection manager 560 selects the next such client originated by the operator included in the termination object and sends the termination object to client assets calculator 562, which receives the termination object and proceeds as described above with the newly selected client originated by the operator.

If no additional clients exists that were originated by the operator, client selection manager 560 sends the termination object to termination manager 540.

When it receives the object, termination manager 540 combines any multipliers (for example, by multiplying them together; or by adding them and subtracting one less than the number of such multipliers, unless there is only one multiplier, in which case it is simply used as the combined multiplier) multiplies the contribution bucket by the combined multipliers and adds any contribution not already part of the contribution bucket, optionally after multiplying it also by the combined multiplier to produce a termination amount. Termination manager 540 then initiates the transfer, or transfers, funds in the amount of the termination amount, to the operator corresponding to the termination, optionally using a financial services network.

SUMMARY

There has been described a method of transforming an office, the method including transforming a space into an office space by having a company supply at least one selected from a group comprising: furnishings, marketing materials, and computer systems, to be used by an operator to operate a financial services business operated by the operator who agrees, prior to and/or upon payment of a termination amount, not to solicit, a plurality of clients the operator has brought to the financial services business which reverts to the company or an operator selected by the company at the time of any termination of a relationship between the company and the operator; identifying a termination amount based at least in part on one or more measures of value the plurality of clients to whom the operator agrees not to solicit are or have been worth to the financial services business operated at least in part in the transformed space; and paying from the company to the operator, the termination amount. The method may include a feature wherein payment is performed via an electronic network, and operating the financial services business is performed via at least one computer network between the financial services business and the company. The method may include a feature wherein the termination amount is computed responsive to an amount of assets held by the financial services business for at least some of the plurality of clients the operator has brought to the financial services business. The method may include a feature wherein the termination amount is computed responsive to an amount of revenue received by the company from at least some of the plurality of clients the operator has brought to the financial services business. The method may include a feature wherein the termination amount is computed responsive to a measure of participation in programs of the company by at least some of the plurality of clients the operator has brought to the financial services business. The method may include a feature wherein the termination amount is paid responsive to the operator confirming said agreement not to solicit. The method may include a feature wherein the one or more measures of value comprise at least one measures of value: of each of the plurality of clients individually and at least one measure of value of a total of the plurality of clients. The method may be implemented in computer software as a computer program that causes a computer system to perform some or all of the method.

There has been described a system for enabling a transformation of an office, the system including a plurality of calculators, each calculator having an input for receiving at least one selected from two dates and one or more measures of value a plurality of clients to whom an operator agrees not to solicit are or have been worth to a financial services business operated in a space transformed into an office space by having a company supply at least one selected from a group comprising: furnishings, marketing materials, and computer systems, to be used by the operator to operate the financial services business operated by the operator who agrees, prior to and/or upon payment of a termination amount, not to solicit, a plurality of clients the operator has brought to the financial services business which reverts to the company or an operator selected by the company at the time of any termination of a relationship between the company and the operator, each of the plurality of calculators for identifying at least one selected from a component of the amount and a multiplier of at least one of one component from a different calculator based at least in part on the two dates and/or one or more measures of value received at said calculator input; and a termination manager having an input coupled to the outputs of the plurality of calculators for receiving the at least one selected from the component and the multiplier from each of said plurality of calculators, the termination manager for identifying a termination amount to be paid from the company to the operator responsive to the at least one selected from the component and the multiplier received from the plurality of calculators. The system may include a feature wherein payment is performed via an electronic network, and operating the financial services business is performed via at least one computer network between the financial services business and the company. The system may include features wherein at least one of the measures of value comprises an amount of assets held by the financial services business for at least some of the plurality of clients the operator has brought to the financial services business; and the termination amount is computed responsive to the amount of assets held by the financial services business for at least some of the plurality of clients the operator has brought to the financial services business. The system may include feature wherein at least one of the measures of value comprises an amount of revenue received by the company from at least some of the plurality of clients the operator has brought to the financial services business; and the termination amount is computed responsive to an amount of revenue received by the company from at least some of the plurality of clients the operator has brought to the financial services business. The system may include features wherein at least one of the measures of value comprises a measure of participation in programs of the company by at least some of the plurality of clients the operator has brought to the financial services business; and the termination amount is computed responsive to a measure of participation in programs of the company by at least some of the plurality of clients the operator has brought to the financial services business. The system may include features wherein the termination manager identifies the termination amount responsive to the operator confirming said agreement not to solicit. The system may include a feature wherein the one or more measures of value comprise at least one measure of value of each of the plurality of clients individually and at least one measure of value of a total of the plurality of clients.

What is claimed is:

1. A method of transforming a building space, the method comprising:
    transforming the building space into a financial services office space by having a company supply for use in the financial services office space at least one selected from a group comprising: furnishings, marketing materials, and computer systems, to operate a financial services business by an operator who agrees, prior to and/or upon payment of a termination amount, not to solicit a plurality of clients the operator has brought to the financial services business, which reverts to the company or an alternate operator selected by the company, at the time of any termination of a relationship between the company and the operator;
    identifying, via a hardware computer processor coupled to a memory a termination amount based at least in part on one or more measures of value the plurality of clients to whom the operator agrees not to solicit are, or have been, worth to the financial services business operated at least in part in the transformed space; and
    paying from the company to the operator, the termination amount.

2. The method of claim 1, wherein payment is performed via an electronic network, and operating the financial services business is performed via at least one computer network between the financial services business and the company.

3. The method of claim 1, wherein the termination amount is identified responsive to an amount of assets held by the financial services business for at least some of the plurality of clients the operator has brought to the financial services business.

4. The method of claim 1, wherein the termination amount is identified responsive to an amount of revenue received by the company from at least some of the plurality of clients the operator has brought to the financial services business.

5. The method of claim 1, wherein the termination amount is identified responsive to a measure of participation in programs of the company by at least some of the plurality of clients the operator has brought to the financial services business.

6. The method of claim 1, wherein the termination amount is paid responsive to the operator confirming said agreement not to solicit.

7. The method of claim 1, wherein the one or more measures of value comprise at least one measures of value: of each of the plurality of clients individually and at least one measure of value of a total of the plurality of clients.

8. A system for enabling a transformation of a building space, the system comprising:
    a plurality of calculators, each calculator comprising a hardware computer processor coupled to a memory and having an input for receiving at least one selected from two dates and one or more measures of value a plurality of clients to whom an operator agrees not to solicit, are, or have been worth to a financial services business operated in the building space transformed into a financial service office space by having a company supply for use in the financial services office space at least one selected from a group comprising: furnishings, marketing materials, and computer systems, to be used by the operator to operate the financial services business operated by the operator who agrees, prior to and/or upon payment of a termination amount, not to solicit a plurality of clients the operator has brought to the financial services business, which reverts to the company or an alternate operator selected by the company at the time of any termination of a relationship between the company and the operator, each of the plurality of calculators for identifying at least one selected from a component of the amount and a multiplier of at least one of one component from a different calculator based at least in part on the two dates and/or one or more measures of value received at said calculator input; and
    a termination manager comprising a hardware processor coupled to a memory and having an input coupled to the outputs of the plurality of calculators for receiving the at least one selected from the component and the multiplier from each of said plurality of calculators, the termination manager for identifying a termination amount to be paid from the company to the operator responsive to the at least one selected from the component and the multiplier received from the plurality of calculators.

9. The system of claim 8, wherein payment is performed via an electronic network, and operating the financial services business is performed via at least one computer network between the financial services business and the company.

10. The system of claim 8, wherein:
    at least one of the measures of value comprises an amount of assets held by the financial services business for at least some of the plurality of clients the operator has brought to the financial services business; and
    the termination amount is identified responsive to the amount of assets held by the financial services business for at least some of the plurality of clients the operator has brought to the financial services business.

11. The system of claim 8, wherein:
    at least one of the measures of value comprises an amount of revenue received by the company from at least some of the plurality of clients the operator has brought to the financial services business; and
    the termination amount is identified responsive to an amount of revenue received by the company from at least some of the plurality of clients the operator has brought to the financial services business.

12. The system of claim 8, wherein:
at least one of the measures of value comprises a measure of participation in programs of the company by at least some of the plurality of clients the operator has brought to the financial services business; and
the termination amount is identified responsive to a measure of participation in programs of the company by at least some of the plurality of clients the operator has brought to the financial services business.

13. The system of claim 8, wherein:
the termination manager identifies the termination amount responsive to the operator confirming said agreement not to solicit.

14. The system of claim 8, wherein the one or more measures of value comprise at least one measure of value of each of the plurality of clients individually and at least one measure of value of a total of the plurality of clients.

15. A computer program product comprising a computer useable medium having nontransitory computer readable program code embodied therein for enabling a transformation of a building space, the computer program product comprising computer readable program code devices configured to cause a computer system to, in conjunction with a transformation of the building space into financial services office space by having a company supply at least one selected from a group comprising: furnishings, marketing materials, and computer systems, to operate a financial services business operated by an operator who agrees, prior to and/or upon payment of a termination amount, not to solicit a plurality of clients the operator has brought to the financial services business, which reverts to the company or an operator selected by the company at the time of any termination of a relationship between the company and the operator:

identify a termination amount based at least in part on one or more measures of value the plurality of clients to whom the operator agrees not to solicit are, or have been, worth to the financial services business operated at least in part in the transformed space; and
pay from the company to the operator, the termination amount.

16. The computer program product of claim 15, wherein payment is performed via an electronic network, and operating the financial services business is performed via at least one computer network between the financial services business and the company.

17. The computer program product of claim 15, wherein the termination amount is identified responsive to an amount of assets held by the financial services business for at least some of the plurality of clients the operator has brought to the financial services business.

18. The computer program product of claim 15, wherein the termination amount is identified responsive to an amount of revenue received by the company from at least some of the plurality of clients the operator has brought to the financial services business.

19. The computer program product of claim 15, wherein the termination amount is identified responsive to a measure of participation in programs of the company by at least some of the plurality of clients the operator has brought to the financial services business.

20. The computer program product of claim 15, wherein the termination amount is paid responsive to the operator confirming said agreement not to solicit.

21. The computer program product of claim 15, wherein the one or more measures of value comprise at least one measures of value: of each of the plurality of clients individually and at least one measure of value of a total of the plurality of clients.

\* \* \* \* \*